(12) United States Patent
Wehrli et al.

(10) Patent No.: US 9,956,500 B2
(45) Date of Patent: May 1, 2018

(54) LIQUID MIXING COLLECTOR AND A METHOD FOR ITS USE

(71) Applicant: Sulzer Chemtech AG, Winterthur (CH)

(72) Inventors: Marc Wehrli, Brütten (CH); Christian G. Bachmann, Ellikon (CH); Hans-Peter Brack, Herrliberg (CH); Florian Kehrer, Effretikon (CH)

(73) Assignee: Sulzer Chemtech AG, Winterthur (CH)

( * ) Notice: Subject to any disclaimer, the term of this patent is extended or adjusted under 35 U.S.C. 154(b) by 194 days.

(21) Appl. No.: 14/904,197

(22) PCT Filed: Jan. 29, 2014

(86) PCT No.: PCT/EP2014/051742
§ 371 (c)(1),
(2) Date: Jan. 11, 2016

(87) PCT Pub. No.: WO2015/007397
PCT Pub. Date: Jan. 22, 2015

(65) Prior Publication Data
US 2016/0151722 A1    Jun. 2, 2016

(30) Foreign Application Priority Data

Jul. 18, 2013  (EP) .................................... 13177042

(51) Int. Cl.
*B01F 3/04* (2006.01)
*B01D 3/32* (2006.01)
(Continued)

(52) U.S. Cl.
CPC ............... *B01D 3/324* (2013.01); *B01D 3/20* (2013.01); *B01D 3/24* (2013.01); *B01F 3/04078* (2013.01); *B01F 3/04468* (2013.01)

(58) Field of Classification Search
CPC .. B01D 3/20; B01D 3/24; B01D 3/324; B01F 3/04078; B01F 3/04468
(Continued)

(56) References Cited

U.S. PATENT DOCUMENTS

| 4,381,974 A | 5/1983 | Furzer |
| 4,744,929 A | 5/1988 | Robinson et al. |

(Continued)

FOREIGN PATENT DOCUMENTS

| CN | 2936375 Y | 8/2007 |
| CN | 201855588 U | 6/2011 |

(Continued)

OTHER PUBLICATIONS

Chinese Office Action dated Nov. 11, 2016 from corresponding Chinese Application No. 201480040432.3.

*Primary Examiner* — Charles Bushey
(74) *Attorney, Agent, or Firm* — Larson & Anderson, LLC

(57) ABSTRACT

A liquid mixing collector includes first and second sump zones, a first and optionally a second liquid collection region, first and second interspersed sets of spaced apart liquid collection channels positioned in the first liquid collection region, the first and second sets of collection channels being associated with the first and second respective sump zones, wherein adjacent liquid collection channel sets are vertically displaced in parallel horizontal planes. The invention also relates to the process of using the collector within a heat or mass transfer column.

22 Claims, 10 Drawing Sheets

(51) Int. Cl.
*B01D 3/20* (2006.01)
*B01D 3/24* (2006.01)

(58) Field of Classification Search
USPC .................................. 261/97, 110, DIG. 85
See application file for complete search history.

(56) References Cited

U.S. PATENT DOCUMENTS

| | | | |
|---|---|---|---|
| 5,645,770 A | | 7/1997 | McNulty et al. |
| 5,695,548 A | | 12/1997 | Trutna |
| 5,935,389 A | * | 8/1999 | Hine ........................ B01D 3/20 |
| | | | 202/158 |
| 6,086,055 A | | 7/2000 | Armstrong et al. |
| 6,749,182 B1 | * | 6/2004 | Larson .................... B01D 3/20 |
| | | | 202/158 |
| 7,114,709 B2 | | 10/2006 | Ender et al. |
| 8,317,166 B2 | * | 11/2012 | Headley ................ B01D 3/008 |
| | | | 261/97 |
| 9,004,460 B2 | * | 4/2015 | Brown ................... B01D 3/008 |
| | | | 261/110 |
| 2004/0099969 A1 | | 5/2004 | Larson et al. |
| 2012/0111717 A1 | | 5/2012 | Headley et al. |

FOREIGN PATENT DOCUMENTS

| | | |
|---|---|---|
| EP | 0879626 A2 | 11/1998 |
| EP | 1711243 B1 | 2/2013 |
| WO | WO 96/04071 A1 | 2/1996 |

\* cited by examiner

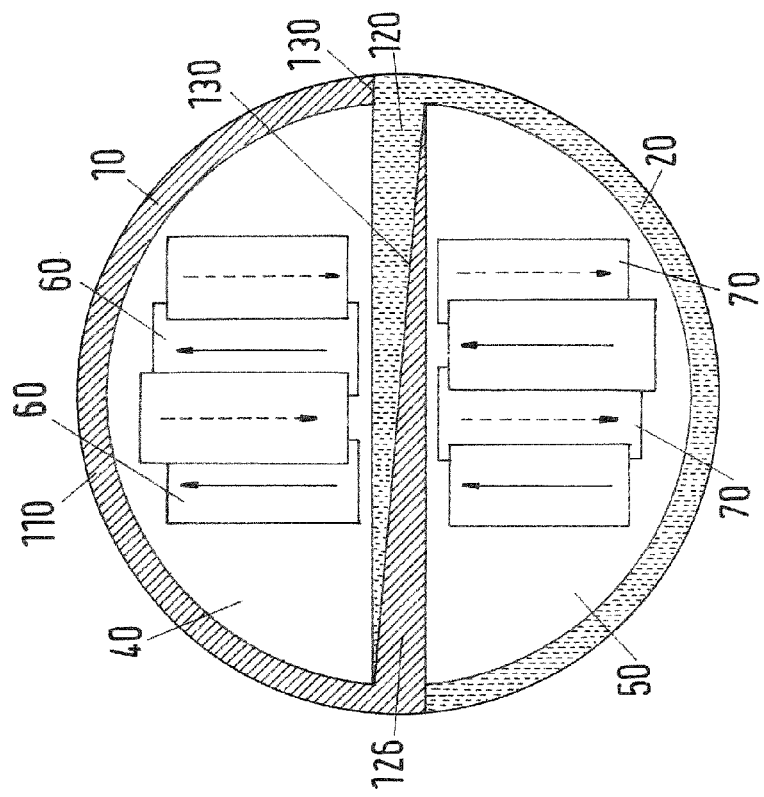
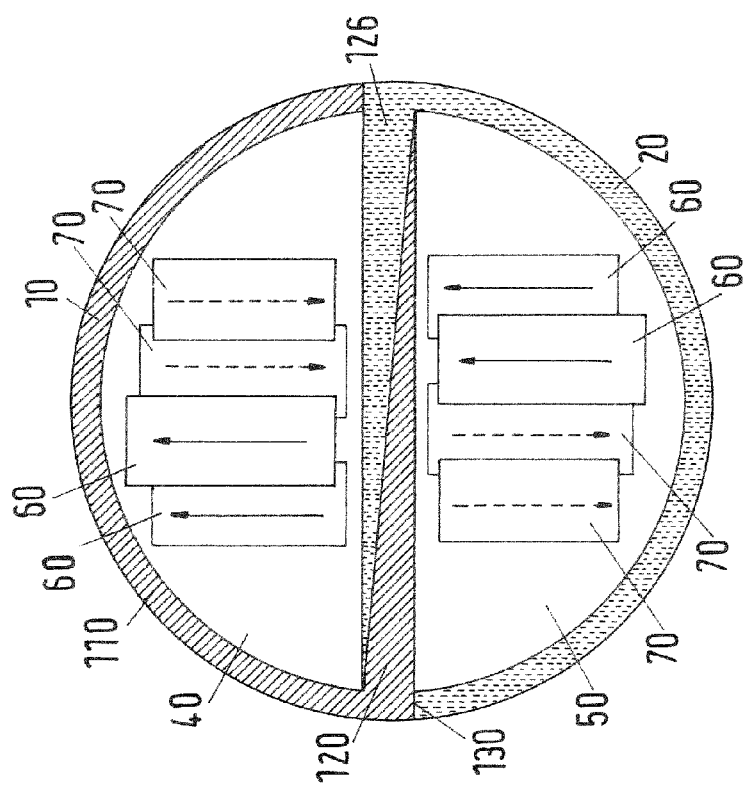
Fig. 4

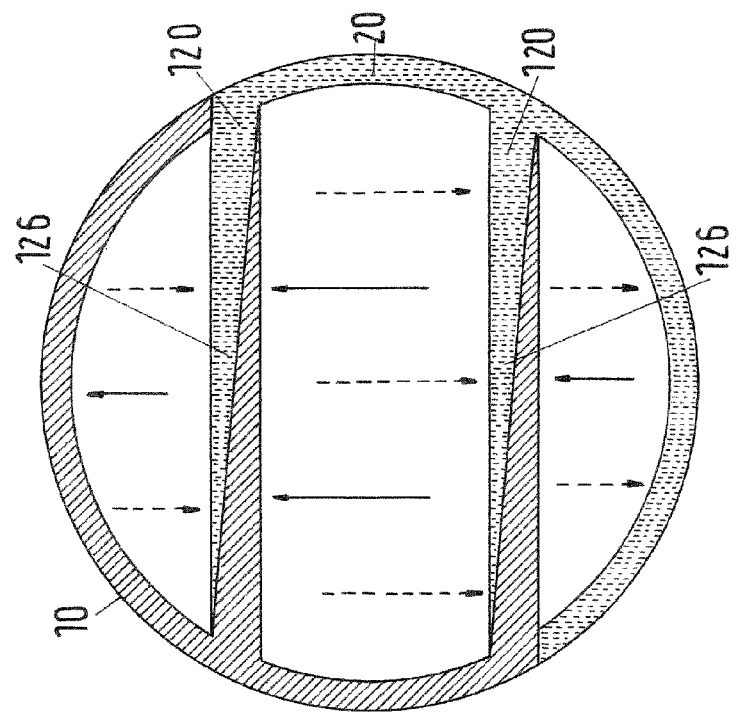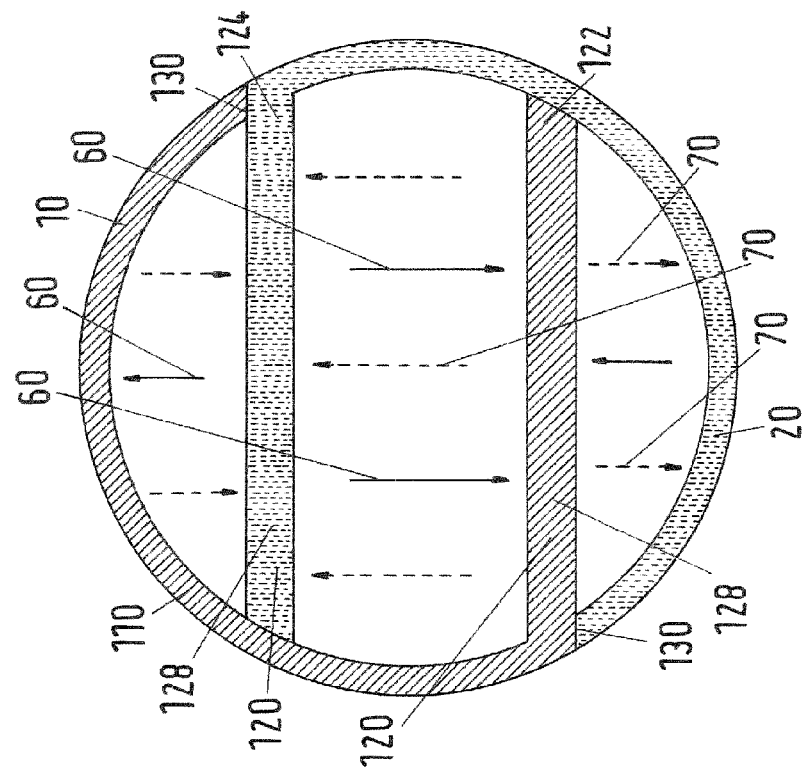
Fig.5

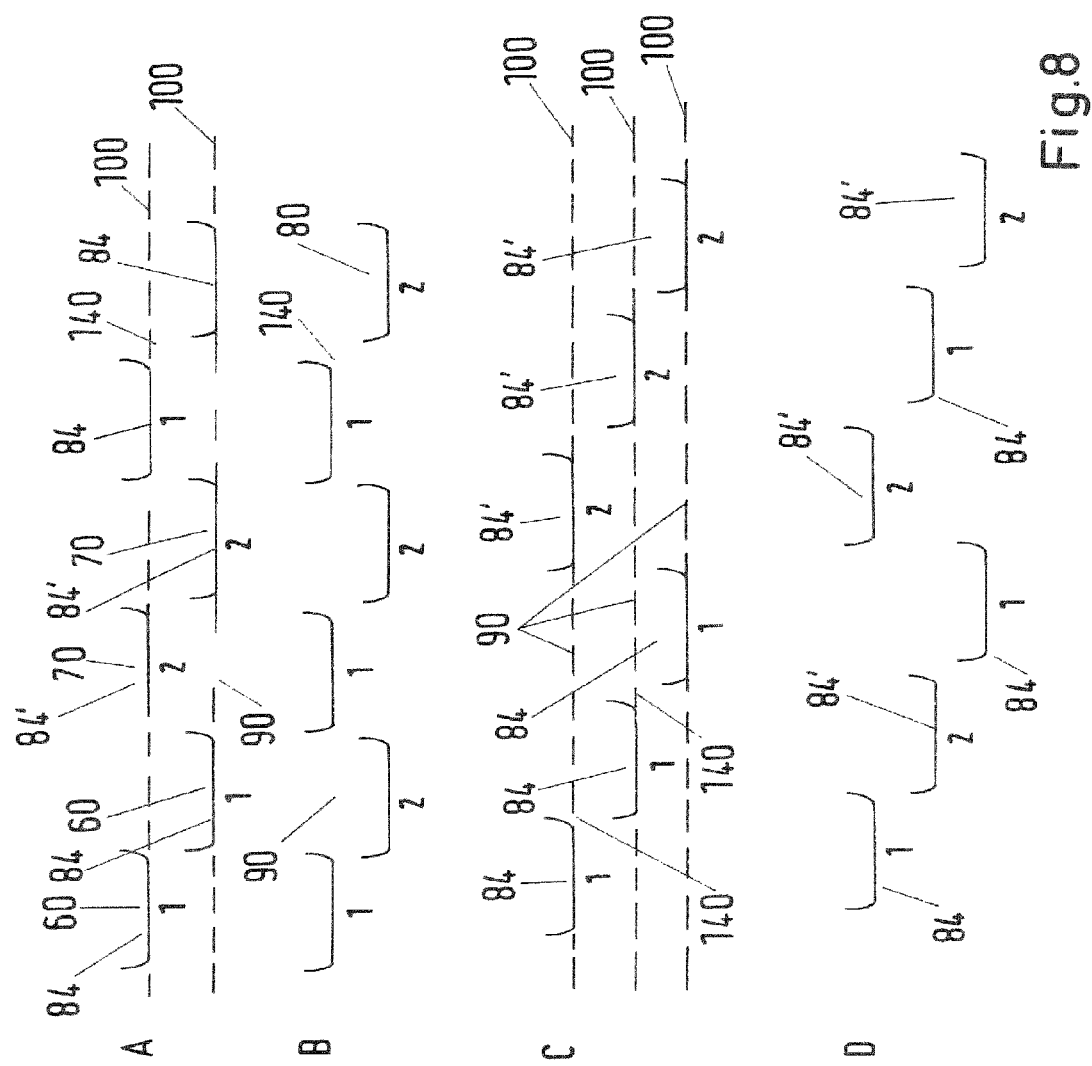

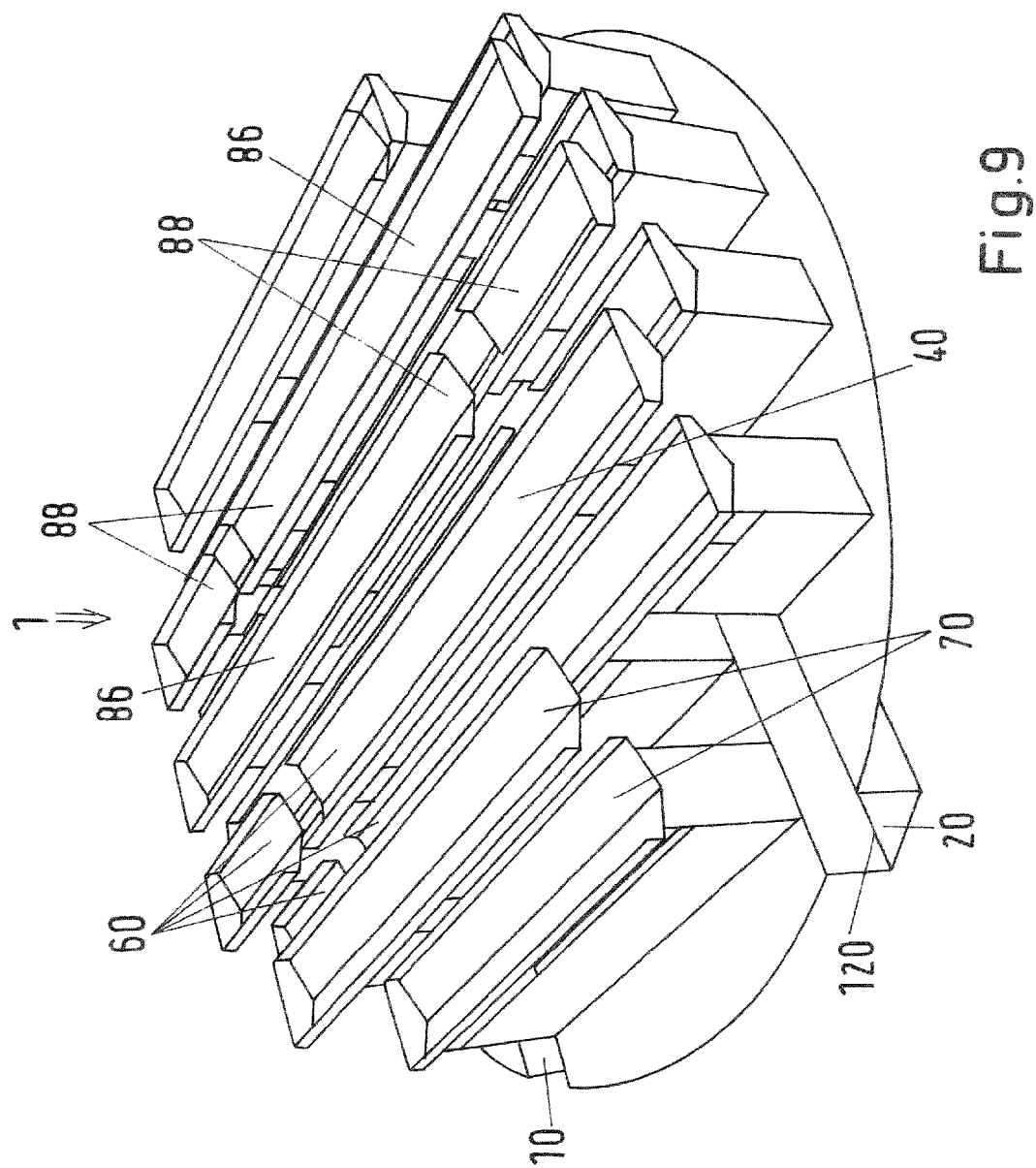

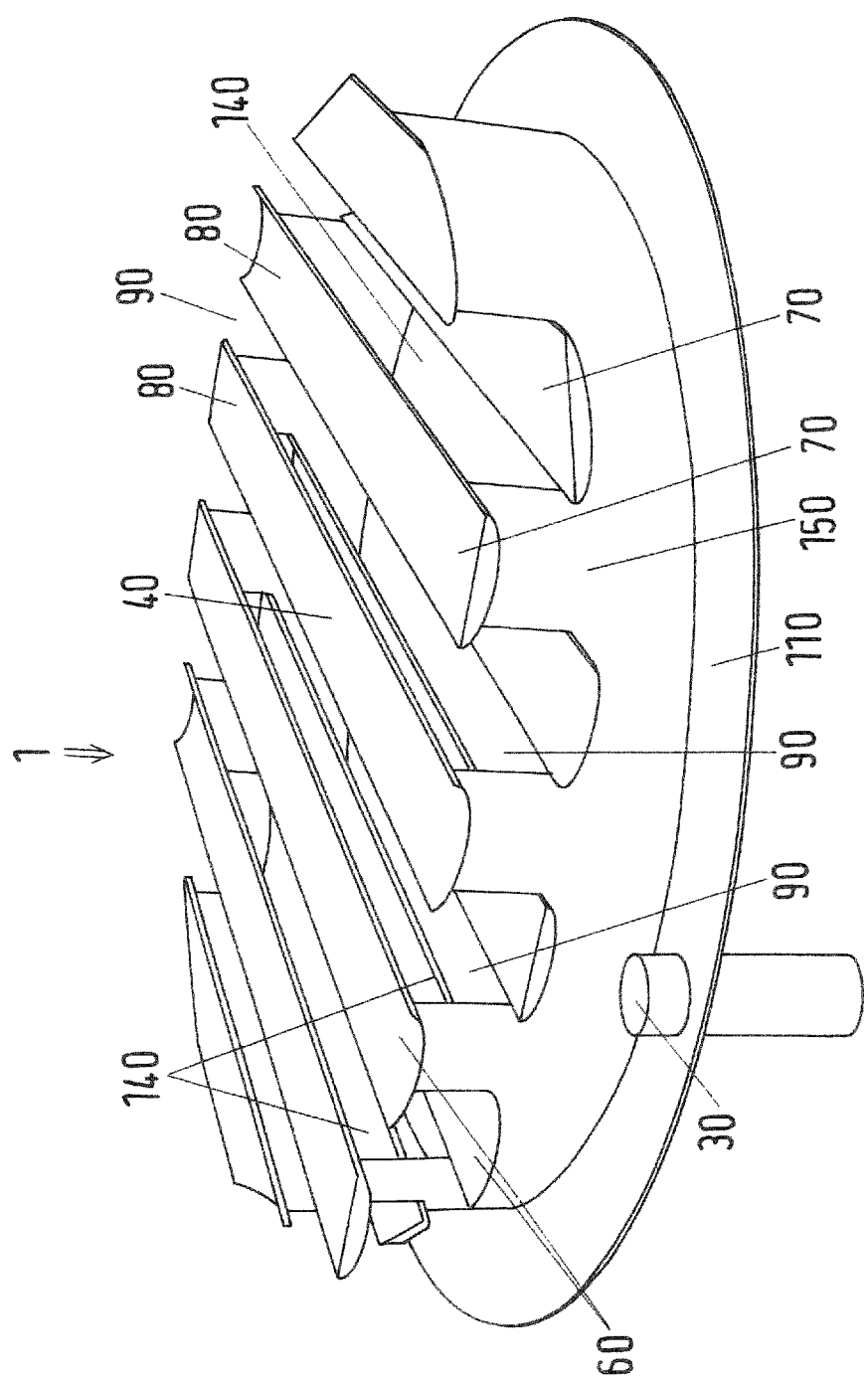

LIQUID MIXING COLLECTOR AND A METHOD FOR ITS USE

BACKGROUND OF THE INVENTION

The present invention relates to a liquid mixing collector for capturing and mixing liquid descending from an overlying zone in a mass transfer or heat exchange column. The present invention also relates to a mass transfer or heat exchange column comprising said collector, use of said collector in a mass transfer or heat exchange column, and a method of collecting and mixing descending liquid in a mass transfer or heat exchange column.

Mass transfer columns, including heat exchange columns, typically include a shell and a plurality of zones within the shell in which packing and/or trays are used to facilitate mass or heat transfer between fluid streams flowing within the column. The fluid streams are normally one or more downwardly flowing liquid streams and one or more ascending vapor streams, although other combinations of fluid streams may be possible. Liquid exiting the bottom of a zone may have different concentrations and compositions at different locations across the horizontal cross section of the zone. In order to reduce these concentrational and compositional maldistributions, the liquid is often collected and mixed before it is then distributed to an underlying zone. To avoid detrimental maldistribution effects, the packing may be split in a number of beds, and the descending liquid may then be collected and redistributed over the cross section of the column in each portion between two beds. Separate collecting, mixing and distributing components are often used to carry out the desired collection, mixing and distribution of the liquid as it descends from one zone to another.

For example, the redistribution is classically achieved by means of a mixing drum. The use of separate components, however, can be undesirable because the vertical spacing occupied by each of these components reduces the available area within the column for other processing of the fluid streams such as the mass or heat transfer and may require that a taller and thus more expensive column be utilized to provide the spacing needed to effect the desired processing operations.

In particular, in order to achieve the best efficiency, beds of structured packing should not exceed a certain height. Increasing the bed height or increasing number of theoretical stages makes the bed prone to effects of maldistribution. As discussed earlier, maldistribution has a negative effect on the separation efficiency and the achievable purity of the distillate stream that is drawn at the top of the column. This aspect has a very high importance in the distillation of mixtures with very close boiling components because such a task can only be achieved with a large number of stages. Examples of such distillations include the separation of styrene monomer from ethylbenzene.

Chimney trays are a well known type of liquid collector that is placed below packing beds in columns of the type described above. They are used to collect the liquid that drains from the packing bed and to further convey it to the next packing bed. Such chimney trays consist of a flat horizontal portion to accommodate liquid. The liquid is collected in a downcomer which guides it into a pipe. The horizontal portion includes openings in the shape of chimneys through which vapor is allowed to rise. The chimneys feature a "cap" or "roof" which collects descending liquid and leads the liquid onto the horizontal portion of the tray.

There exists an alternative type of liquid collector, namely the vane collector. The vane collector has a much simpler construction than the chimney tray, but it is only useful for low liquid loadings. For applications with high loading (typically above 25 to 30 $m^3/m^2h$), the chimney tray is preferred due to its more flexible set-up. For example, increasing the height of the chimneys allows for a higher liquid level on the tray, and the flexible spacing between chimneys allows this spacing to be increased to give a larger area that may then be occupied by liquid on the tray.

Thus chimney trays can be flexibly engineered to deal with various types of liquid and vapor loads. However, this flexibility has the disadvantage of increasing the complexity of the construction. For example, trays must be tight such that no liquid penetrates through seams between the chimneys and the horizontal portion of the tray. As a consequence, chimneys are built as welded parts which are then also welded onto the horizontal portion of the chimney trays. Thus, chimney trays are a rather expensive liquid collector design to construct.

Both chimney- and vane-type liquid collectors may be used with mixing drums, as discussed earlier; however, the use of these separate liquid collecting and mixing components requires then a complex construction that disadvantageously takes a lot of additional space between the beds and raises the height of the column. Alternatively instead of using a separate mixing drum, a chimney tray combined with a mixing box installed on top of the chimney tray is known from EP 0 879626 A2. However, the use of a mixing box nonetheless still requires considerable vertical spacing in the interbed section, the disadvantages of which have been discussed earlier. It is noted that a special vane collector in which both liquid collecting and mixing functions are combined is known from U.S. Pat. No. 7,114,709 B2; however, this special vane collector still suffers from the disadvantages of vane collectors, for example, in applications having high loadings.

In conclusion, it would be desirable to have a chimney tray having combined liquid collection and mixing functions, especially one that is less expensive and requires less welding to construct, and particularly one for use in applications having high loadings.

SUMMARY OF THE INVENTION

Starting from this state of the art, it is an object of the invention to provide a provide a combined liquid mixing collector that does not suffer from the previous mentioned deficiencies, particularly a complex and expensive construction, requiring considerable vertical space, and lack of usefulness at high liquid loadings. Further objects of the invention include providing a mass transfer or heat exchange column comprising said liquid mixing collector, use of said collector in a mass transfer or heat exchange column, and a method of collecting and mixing descending liquid in a mass transfer or heat exchange column.

According to the invention, these objects are achieved by a liquid mixing collector for capturing and mixing liquid descending from an overlying zone in a mass transfer or heat exchange column, the collector comprising:

at least a first and a second sump zone, at least one discharge outlet positioned in each of said first and second sump zones through which liquid can drain when present in said first and second sump zones;

at least a first and optionally a second liquid collection region each at least partially bounded by one of said first and second sump zones;

at least a first and a second set of spaced apart liquid collection channels positioned in at least a first liquid collection region; said first set of liquid collection channels embodied such that said liquid collection channels (80) are substantially parallel to and interspersed with said second set of liquid collection channels in the first liquid collection region; drain openings positioned in said liquid collection channels to allow liquid to drain from said liquid collection channels, when present therein, into said first and second sump zones;

said first set of liquid collection channels in the first liquid collection region being associated with said first sump zone so that liquid when present in said first set of liquid collection channels preferentially flows through the drain openings of the first set of liquid collection channels into said first sump zone;

said second set of liquid collection channels in the first liquid collection region being associated with said second sump zone so that liquid when present in said second set of liquid collection channels preferentially flows through the drain openings of the second set of liquid collection channels into said second sump zone;

ascending vapor flow channels located in a spacing between the liquid collection channels in the liquid collection regions;

wherein adjacent liquid collection channels of the first and second sets of liquid collection channels are vertically displaced from each other in one of at least two to four parallel horizontal planes.

The inventors have surprisingly found that said liquid mixing collectors may be relatively simply and inexpensively constructed versus conventional chimney trays because relatively little welding is required in the construction of the liquid mixing collectors of the invention. This lack of requiring extensive welding is a result of the use of a system of liquid collection channels and underlying associated guide plates and/or mounting plates and/or supporting plates and/or support grids and/or supporting walls on which the channels are mounted. In this system, the channels may be simply laid on the underlying plates, supports, grids and/or walls and fixed in their desired position by clamps or screws. Using such clamp or screw-mounted systems minimizes then the need for welding.

Furthermore trials using colored tracers demonstrate that the liquid mixing collectors of the present invention are as efficient in mixing as conventional trays combined with either mixing drums or a mixing box. Quite importantly the liquid mixing collectors of the present invention are more compact and require much less vertical space in the interbed sections of columns than do separate combinations of collecting and mixing components.

Compared to the vane-based liquid mixing collectors disclosed in U.S. Pat. No. 7,114,709 B2, the liquid mixing collector of the present invention is simpler to design and construct because it only requires one single liquid collection region, whereas the liquid mixing collector of US '709 requires at least two liquid collection regions. Furthermore the liquid mixing collector of US '709 requires a plurality of complexly-constructed upwardly extending deflectors for directing descending liquid into the liquid collection channel. In contrast the liquid mixing collector of the present invention and its liquid collection channels do not require this feature in order to have a directed flow of liquid into the channels, and thus they are both simpler and less expensive to construct. Of course, as discussed earlier, the chimney-type tray design of the present invention may be flexibly designed for use in applications involving high liquid loadings, whereas the vane-type trays of US '709 cannot.

According to the invention, these further objects are achieved firstly by a mass transfer or heat exchange column comprising one or more liquid mixing collector(s) of the present invention, and secondly by a use of the liquid mixing collector of the present invention in a mass transfer or heat exchange column for liquid flow rates higher than 10, preferably 15, more preferably 20 $m^3/m^2h$.

The third further object is achieved by a method of collecting and mixing descending liquid in a mass transfer or heat exchange column, said method comprising the steps of:

collecting descending liquid in at least a first and a second set of liquid collection channels positioned within each of at least a first liquid collection region and an optional second liquid collection region, said first set of liquid collection channels embodied such that said liquid collection channels (80) are substantially parallel to and interspersed with said second set of liquid collection channels in at least said first liquid collection region, and said second liquid collection region if present, wherein adjacent liquid collection channels of the first and second set of liquid collection channels are vertically displaced from each other in one of at least two to four parallel horizontal planes;

preferentially directing a first quantity of liquid from said first set of liquid collection channels in both of said first liquid collection region and said second liquid collection regions if present, into a first sump zone and preferentially directing a second quantity of liquid from said second set of said liquid collection channels in at least said first liquid collection region and said second liquid collection region into a second sump zone;

draining said liquid from said first and second sump zones.

These further objects of the invention share the advantages obtained by the liquid mixing collector of the invention, namely a chimney tray having combined liquid collection and mixing functions and thus requiring less vertical space, especially a chimney tray that is less expensive and requires less welding to construct, and particularly a liquid mixing collector for use in applications having high loadings.

In one embodiment of the liquid mixing collector and in one embodiment of the method of the invention, the second liquid collection region is present. In still other embodiments, further additional liquid collection regions may be present.

In one embodiment of the liquid mixing collector of the invention, it comprises an annular sump and preferentially one or more chordal sumps. Annular sumps may advantageously be used alone for liquid collection in small diameter collectors, and an annular sump helps collect and distribute liquid in a single hydraulically-communicating system. Furthermore annular sumps may advantageously be welded into the collector, thereby minimizing the risk of leakage. Chordal sumps are required however for liquid communication and distribution in larger diameter collectors. Chordal sumps advantageously enable the use of reasonably-sized plates for dividing a sump into sump zones. Blocking or end plates may be used to impede liquid flow and perforated plates, meshes, gauzes, or weirs may be used to allow a controlled liquid flow. Thus in this manner it is possible to divide the sumps into portions and to allow the creation of sump zones and divided sumps.

According to a specific embodiment of the liquid mixing collector having an even number of chordal sumps, the first sump zone comprises at least one portion of the annular sump and one portion of one or more chordal sumps, and preferentially at least one portion of each chordal sump, more preferably all of the even chordal sumps, and the second sump zone comprises at least one portion of the annular sump and one portion of one or more chordal sumps, preferentially at least one portion of each chordal sump, or more preferably all of the odd chordal sumps. One skilled in the art will understand that the choice of which outer edge to start from in numbering the chordal sumps in order to determine whether they are even or odd will depend on which sump zone has been arbitrarily labelled the first and which the second sump zone. The labelling of sumps and sump zones will be made such that the any undivided even chordal sumps are predominantly associated with the sump zone labelled as the first, and any undivided odd chordal sumps are predominantly associated with the sump zone labelled as the second. The more preferable designs having an even number of chordal sumps will have no divided chordal sumps (sumps in which one portion is part of one sump zone and another portion is part of another sump zone). Such designs lacking divided chordal sumps are easier and simpler and cheaper to construct, as they require less material, engineering and welding etc.

According to a specific embodiment of the liquid mixing collector having an odd number of chordal sumps, the first sump zone comprises at least one portion of the annular sump and at least one portion of one chordal sump, preferably at least a portion of only one divided chordal sump and half of the remaining undivided chordal sumps, wherein the second sump zone comprises at least one portion of the annular sump and at least one portion of one chordal sump, preferably at least a portion of only one divided chordal sump and half of the remaining undivided chordal sumps, and wherein the chordal sumps associated with the first sump zone preferably alternate with the chordal sumps associated with the second sump zone. Such designs will minimize the number of divided chordal sumps, thus allowing simpler and less expensive constructions, as discussed earlier.

In one specific embodiment of the liquid mixing collector having chordal sumps, the collector is suitable for collecting liquid to be discharged by means of one to four discharge outlets per sump zone, and the collector comprises from two to ten chordal sumps. In such embodiments, it is advantageous to minimize the number of chordal sumps in order to simplify the construction without negatively impacting the desired application and desirable mixing and collecting properties of the collector.

In another specific embodiment of the liquid mixing collector having chordal sumps, the collector is suitable for collecting liquid to be distributed to a section of a column located below the collector, and the collector comprises from one to twenty, preferably 5 to 10 chordal sumps per meter measured over the diameter of the collector in an orientation perpendicular to the chordal sumps. In this specific embodiment, it is advantageous to increase the number of chordal sumps in order to optimize the distribution density without negatively impacting the desired application of the collector. In this case the chordal sumps function as redistributors. In this embodiment, as well as others, one or more or all of the sump regions may have a plurality of discharge outlets.

In another embodiment, the collector lacks an annular sump, and it comprises either at least one divided chordal sump or two chordal sumps, wherein the first liquid collection region and the second liquid collection region, when present, and the first and second set of liquid collection channels are preferably embodied such that each of the chordal sumps receives a substantially same amount of collected liquid from each of the first and second collection regions. Annular sumps are generally welded into the collector whereas chordal sumps may be constructed by means of vertical baffles mounted by clamping or bolting; therefore welding may be advantageously minimized in the construction of this embodiment.

In another embodiment having similar advantages to the previous embodiment, the first sump zone and the second sump zone are separated from each other by means of vertical baffles. The use of vertical baffles is a simple and low cost method to construct separate sump zones.

In still another embodiment, the height (h) of the collector is less than 2, preferably 1.5, more preferably 1 meter. The collector design of the present invention allows a compact construction which is then of benefit for applications in columns having limited height or vertical space available.

In yet another embodiment of the collector, the liquid collection channels in each of the two to four parallel horizontal planes are embodied so as to collect a substantially same amount of liquid in each of the horizontal planes. "Substantially same amount" means the amounts are within about 10% of each other on a mass basis, preferably the amounts are the same when taking into account the measurement error of the measurement method. The amount of liquid may be measured based on the liquid flow rates through the drain openings 82 of the collector 1 when liquid is homogeneously distributed over ("rained over") the cross section of the collector 1 and adding the sum of the liquid flow rates for the channels of each horizontal plane. In the case of embodiments based on FIG. 8B, the amount of liquid per horizontal plane may often be conveniently measured by adding together the flow rates of all the discharge outlets (30) for each sump zone. This embodiment has the advantage of improving the mixing quality obtained with the collector.

In yet a further embodiment of the collector, the liquid collection channels are subdivided into subsets of liquid collection channels, wherein each subset consists of one liquid collection channel in each of the horizontal planes, wherein adjacent subsets are in alternating association with the first and second sump zones. The design of this embodiment reduces the influence of counter-current vapour flow on the mixing quality, and inequalities in the amounts of liquid collected by each plane are compensated for.

In another embodiment of the collector, the second liquid collection region is present, and the first and second liquid collection regions are embodied so as to collect a substantially same amount of liquid in each region. A substantially same amount of liquid may be collected by varying the size of the liquid collection regions and the density, arrangement and nature of the liquid collection channels in the liquid collection regions, as well as the number and position of downcomers. The design of this embodiment facilitates a homogenous mixing.

In still another embodiment of the collector, a plurality of upwardly extending deflectors having surfaces for directing liquid when descending from an overlying zone into said liquid collection channels are absent from said collector. As discussed earlier, such prior art deflectors add to the complexity and cost of the collector, and thus it is advantageous to eliminate them as may be done in the present invention. Furthermore such upwardly extending deflectors disadvantageously increase the risk of entrainment, particularly for higher flow rates. This risk of entrainment arises because the upwardly rising gas is forced to pass through a "shower" of liquid falling from the upwardly extending deflectors to the channels below. In addition, the full cross-section of the gas openings is not effectively utilized because gas will be accelerated as it travels through the tortuous pathway around the upwardly extending deflector.

In yet another embodiment of the collector, at least a portion, preferentially all, of the liquid when present in said first set of liquid collection channels flows through the drain openings of the first set of liquid collection channels into said first sump zone. The design of this embodiment makes it possible to use a classical chimney tray construction in which the chimney "caps" are embodied such that they direct or split the collected liquid into specific sump zones.

In still another embodiment of the collector, at least a portion, preferentially all, of the liquid when present in said second set of liquid collection channels flows through the drain openings of the second set of liquid collection channels into said second sump zone. The design of the embodiment makes possible to use a classical chimney tray construction having a sloped deck and in which the chimney "caps" are embodied such that the direct or split the collected liquid into specific sump zones. In the specific embodiment in which all of liquid flows in this way, it is noted that the collector is no longer a classical chimney tray type, as it is now primarily an arranged collection of channels.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one liquid mixing collector claim may be combined with the subject matter of one or more other liquid mixing collector claims or the subject matter of one or more method claims or the subject matter of a mixture of one or more liquid mixing collector claims and method claims. By analogy, the subject matter of any one method claim may be combined with the subject matter of one or more other liquid mixing collector claims or the subject matter of one or more method claims or the subject matter of a mixture of one or more liquid mixing collector claims and method claims. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned liquid mixing collector embodiments may be combined with the subject matter of one or more of the other above-mentioned method, use or column embodiments or vice versa without limitation so long as technically feasible.

BRIEF DESCRIPTION OF THE DRAWINGS

The invention will be explained in more detail hereinafter with reference to various embodiments of the invention as well as to the drawings. The schematic drawings show:

FIG. 4 shows a schematic view of an embodiment of an annular sump and a divided chordal sump in combination with a liquid collection configuration of type A or B.

FIG. 5 shows a schematic view of an embodiment of an annular sump and two chordal sumps and in combination with a liquid collection configuration of type B in which: a. there are no divided chordal sumps, b. both chordal sumps are divided chordal sumps.

FIG. 8 shows a schematic view of four embodiments of liquid collection configurations in which first and second sets of liquid collection channels are vertically displaced from each other in one of A and B: two parallel horizontal planes, C and D: three parallel horizontal planes.

FIG. 9 shows a schematic view of an embodiment of a liquid mixing collector having only a first liquid collection region and two chordal sumps but lacking an annular sump.

FIG. 10 shows a schematic view of a liquid collection region illustrating the feature of a gap between adjacent liquid collection channels and a merlon-shaped liquid collection channel support system.

DETAILED DESCRIPTION OF THE INVENTION

Definitions

As used in the specification and claims of this application, the following definitions, should be applied:

"a", "an", and "the" as an antecedent may refer to either the singular or plural unless the context indicates otherwise.

The term "preferentially flows" as in "liquid when present in said first set of liquid collection channels preferentially flows through the drain openings of the first set of liquid collection channels into said first sump zone" means that this flow pattern is preferential. In one embodiment of the invention, the indicated flow is primarily in the preferential manner (majority of the flow volume). In another embodiment, the flow is substantially all in the preferential manner (i.e. more than 90% by volume), and in another embodiment all of the flow is in the preferential manner.

The term "preferentially directing" as in "preferentially directing a first quantity of liquid from said first set of liquid collection channels in both of said first liquid collection region and said second liquid collection regions, if present, into a first sump zone" means that this directing of liquid is preferential. In one embodiment of the invention, the indicated directing is primarily in the preferential manner (majority of the flow volume). In another embodiment, the directing of the liquid is substantially all in the preferential manner (i.e. more than 90% by volume), and in another embodiment all of the liquid is directed in the preferential manner.

Numerical values in the present application relate to average values. Furthermore, unless indicated to the contrary, the numerical values should be understood to include numerical values which are the same when reduced to the same number of significant figures and numerical values that differ from the stated value by less than the experimental error of the conventional measurement technique of the type described in the present application to determine the value.

Figure 1:
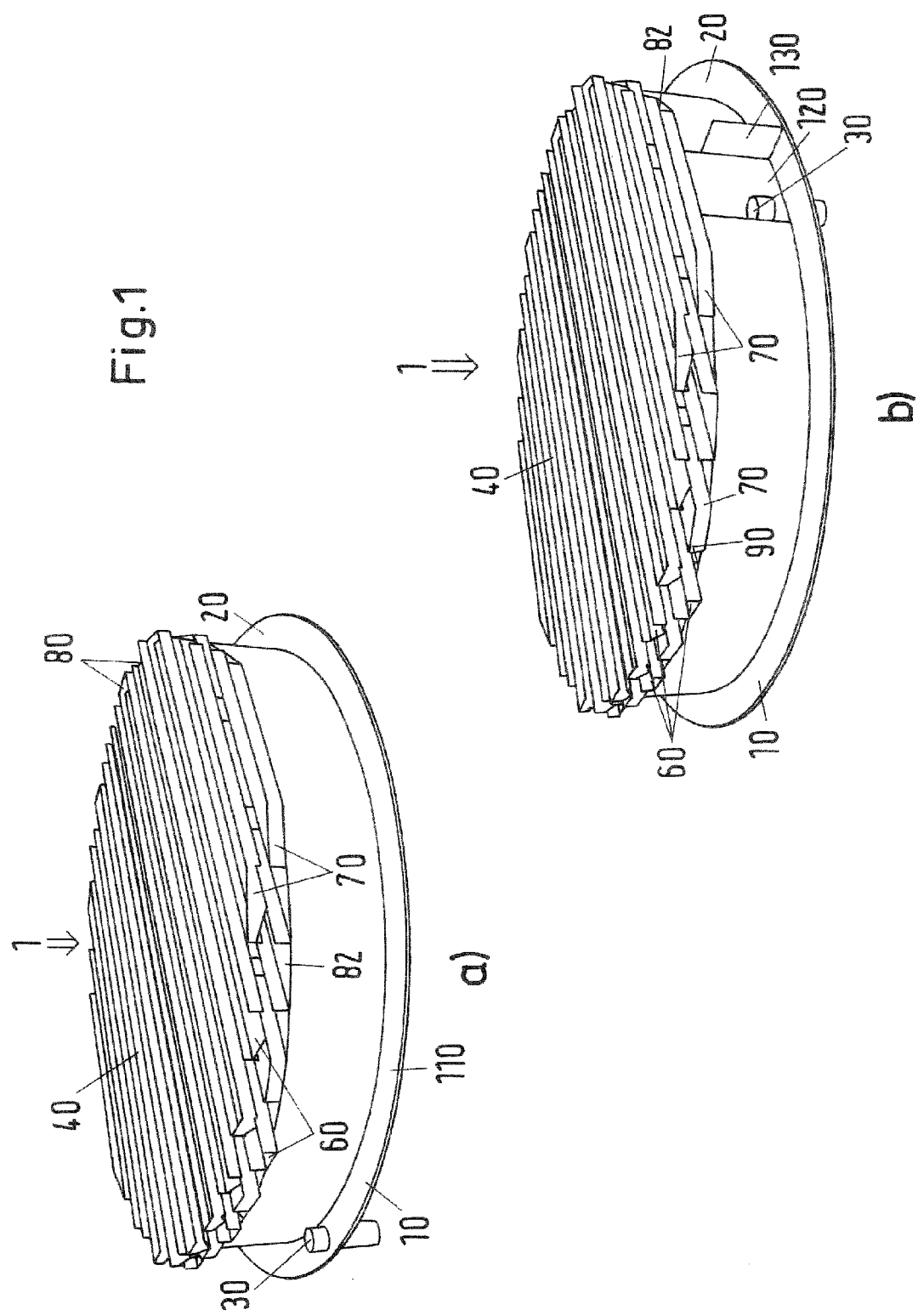
FIG. 1 shows a schematic view of two embodiments of a liquid mixing collector of liquid collection configuration type A having only a first liquid collection region.

FIG. 1 shows a schematic view of two embodiments of a liquid mixing collector 1 for capturing and mixing liquid descending from an overlying zone in a mass transfer or heat exchange column. These particular embodiments comprise only a first liquid collection region 40, and an optional second liquid collection region 50 is absent. In addition, the embodiment in FIG. 1a. comprises an annular sump 110, and the embodiment on FIG. 1b. comprises an annular sump 110 and one chordal sump 120. Furthermore the embodiments of FIG. 1 have a liquid collection configuration of type A, as in FIG. 4A, in which pairs of adjacent liquid collection channels 80 are associated with the same set (60 or 70) of channels 80 and sump zone (10 or 20). It can be seen that the pairs of adjacent channels 80 are associated with the same set and sump zone because their drain openings 82 are on the same side of the figure (i.e. left or right). This particular liquid collection configuration is further illustrated in FIG. 8A.

As seen in the two embodiments of FIG. 1, there is a lower group of channels 80 and an upper group of channels 80. The lower group of channels 80 is interspersed between the upper group of channels in two parallel horizontal planes 100 (see FIG. 8A) according to the liquid collection configuration of type A, having an adjacent pair-wise alternating pattern of flow directions in the channels. The channels 80 in the upper plane 100 form the "caps" or "roofs" of the chimneys, whereas the channels 80 in the lower plane 100 provide horizontal liquid collecting portions between the chimneys. Both sets of channels lead collected liquid into an annular sump 110 in FIG. 1a. and into an annular sump 110 and a chordal sump 120 in FIG. 1b. The annular sump 110 in FIG. 1a. and the annular sump 110 and chordal sump 120 in FIG. 1b. are divided into portions that are associated together by means of fluid communication for liquid exchange in order to provide first and second sump zones (10, 20). Liquid collected in the sump zones (10, 20) may be discharged from the sump zone (10, 20) by means of sump discharge outlet(s) (30) and conveyed to a distributor of the next section below by conventional means such as one or more tubes.

The form of the cross-section of the channels 80 is not specifically limited, and, for example, it may be rectangular, curved or triangular in shape. One skilled in the art will understand that the geometry and number of channels 80 will depend upon the amount of liquid to be collected. For example, large amounts of liquid may require channels with higher walls. An optimum shape of the channels 80 may be selected based on considerations such as mechanical stability, simplicity of construction, minimizing gas flow resistance, and cost. The channels 80 may be closed on one side to force liquid flow to the other side. In some embodiments, the channels 80 may be inclined with respect to the horizontal plane so as to direct the collected liquid in a preferred direction. These features can be used to achieve mixing of liquid by forcing liquid of specific channels 80 towards either the first or second sump zones (10, 20). An easy approach to obtain good mixing is to select pairs of channels 80 in lower and upper planes 100 and to let these pairs be closed on alternating sides such as the left or right in the liquid mixing collector 1 of FIG. 1 having a configuration as in FIG. 8A.

Within at least a first and optionally a second liquid collection region 40, 50, the geometric arrangement of the first set of liquid collection channels 60 to the second set of liquid collection channels 70 is such that they are substantially parallel to one another. In one embodiment all of the liquid collection channels 70 within each individual liquid collection region (e.g. 40, 50) are arranged substantially parallel to one another; however, in some embodiments different collection regions may have relative orientations of liquid collection channels 70 that differ from one another. The first and second set of liquid collection channels (60, 70) are arranged substantially parallel to one another, as in FIGS. 1 to 7; such an arrangement has been found to simplify the construction and thus reduce the cost of the liquid mixing collector 1.

It is noted that the embodiment of the liquid mixing collector 1 shown in FIG. 1b. makes use of vertical baffles 130 to physically separate and create the first and second sump zones (10, 20). In contrast, the embodiment shown in FIG. 1a. does not require the use of vertical baffles to create sump zones. In this embodiment, sump discharge outlets 30 are located on opposite sides of the annular sump 110 (Note: only one sump discharge outlet 30 is seen in each of FIG. 1a and FIG. 1b), and thus collected liquid in the annular sump 110 will generally flow into the nearest sump discharge outlet 30.

Figure 2:
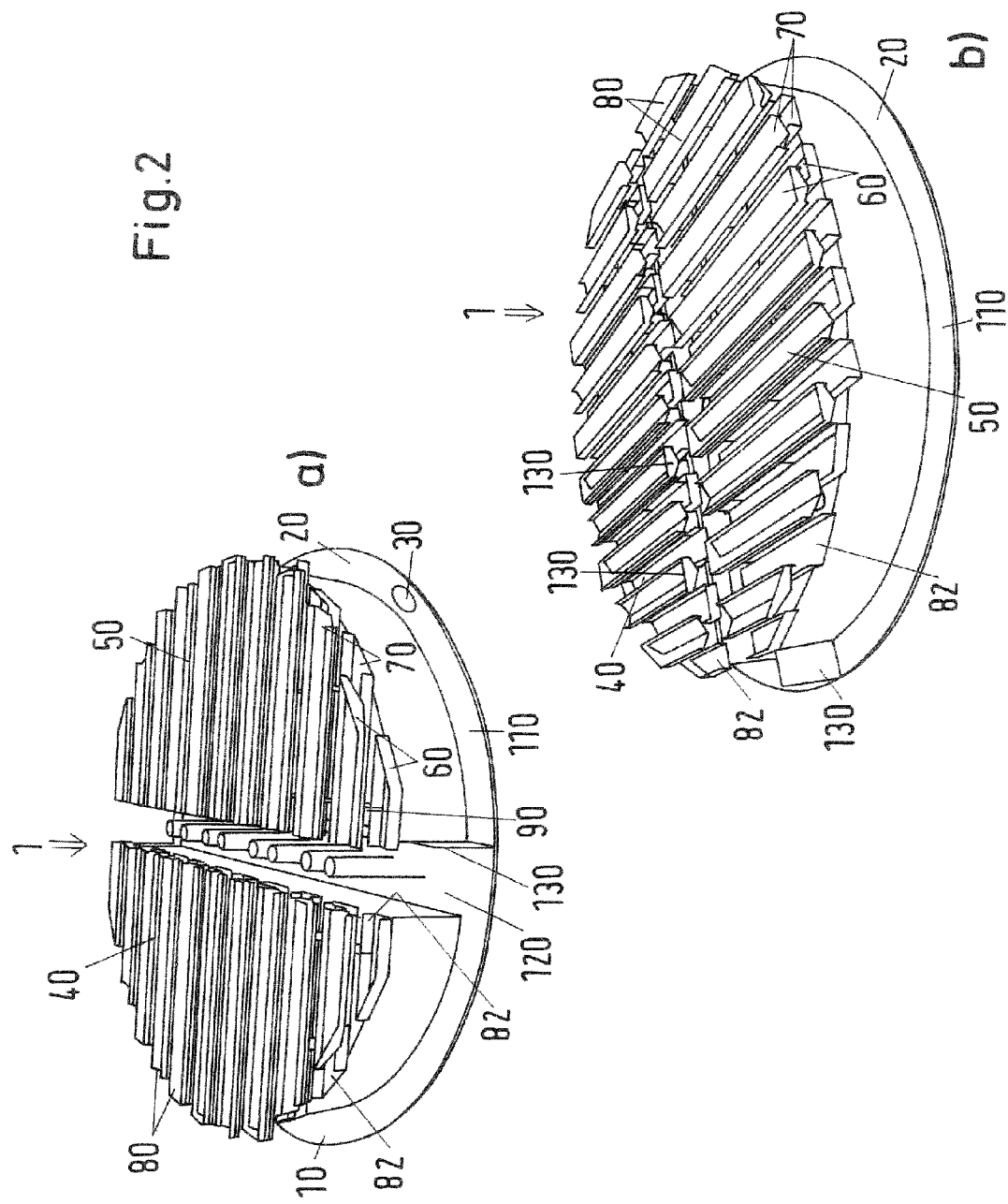
FIG. 2 shows two schematic rotated views of an embodiment of a liquid mixing collector of configuration type A having first and second liquid collection regions.

Another example of an alternating pair-wise configuration of channels 80 is shown in FIG. 2 for an embodiment of a liquid mixing collector 1 of liquid collection configuration type A having first and second liquid collection regions (40, 50) and an annular sump and a chordal sump 120. In this configuration of channels 80 and their drain openings 82, the pairs alternatively drain into the annular sump 110 or the chordal sumps 120, as shown schematically in the liquid collection and flow configuration of FIG. 4A.

It is noted that the two embodiments shown in FIG. 2 both have first and a second liquid collection regions (40, 50). In these embodiments, it is noted that the chordal sumps 120 generally create two separate liquid collection regions by making the liquid collection channels 80 discontinuous so that they terminate at the edge of the chordal sump 120 with either a drain opening 82, which allows them to drain into the chordal sump 120, or with a vertical baffle 130, which prevents them from draining into the chordal sump 120. In other words, these embodiments lack any liquid collection channels that bridge over the chordal sump 120.

In several embodiments of the liquid mixing collector 1 of the invention, additional further liquid collection regions may be created by the presence of chordal sumps 120, which may act to make all of the liquid collection channels 80 discontinuous over the chordal sump 120. As mentioned earlier, chordal sumps 120 are required for liquid communication and distribution in larger diameter liquid mixing collectors 1, therefore larger diameter liquid mixing collectors 1 will often have multiple liquid collection regions. In embodiments in which no liquid collection channels 80 bridge over the chordal sumps 120 present, then the number of liquid collection regions will generally be equal to the number of chordal sumps 120 plus one.

Figure 3:
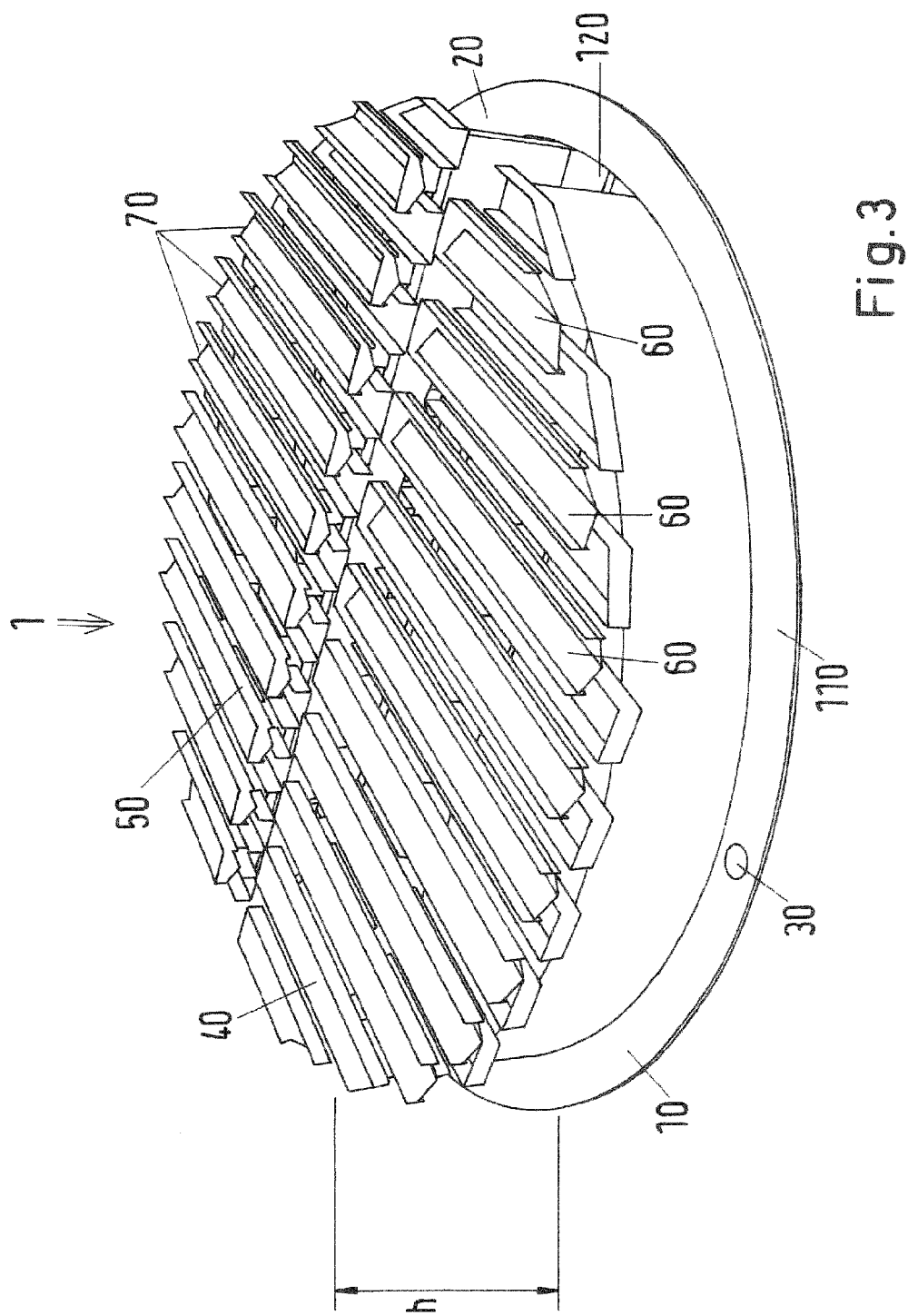
FIG. 3 shows a schematic view of an embodiment of a liquid mixing collector of liquid configuration type B having first and second liquid collection regions.

In an alternative embodiment to that of FIG. 2, a liquid mixing collector 1 having first and second liquid collection regions (40, 50) and an annular sump and a chordal sump 120 may be constructed with a liquid collection configuration of type B (FIG. 8B), as shown schematically in FIG. 3. In this example embodiment, the channels 80 in the lower plane 100 are closed on the outer side of the annular sump in order to allow liquid to flow in the central chordal sump 120. In contrast, the channels 80 of the upper plane are closed on the inner side of the central chordal sump thus allowing liquid to flow into the annular sump 110. This particular liquid collection and flow configuration is shown schematically in FIG. 4B. It is noted however that with this arrangement, there is a risk that the channels 80 in the lower plane 100 receive less liquid despite having an equal channel width as the channels in the upper plane 100. For example, vapor emerging from the lateral openings between the channels 80 may force liquid to drain into the channels 80 of the upper plane 100. This effect can be alleviated by choosing wider lower channels 80 (e.g. 1.1 to 2 times the width of the upper channels 80). However, it may be difficult to determine the optimum dimensions; and furthermore they may depend on the vapor flow rate. Therefore an easier approach is to select alternating pairs of channels 80 draining into alternating sump regions, as in FIGS. 1 and 2.

FIG. 5 illustrates two example embodiments of the first and second sump zones (10 and 20) for an embodiment of a liquid mixing collector 1 of the invention having an annular sump 110, two chordal sumps 120, and liquid collection and flow configurations of type B (FIG. 8B). In the example embodiment a. there are no divided chordal sumps 126 and only undivided chordal sumps 128. In the example embodiment b. both chordal sumps 120 are divided chordal sumps 126. For liquid mixing collectors 1 having an even number of chordal sumps 120, it is noted that there will preferably by also an even number of divided chordal sumps 126, most preferably no divided chordal sumps 126 and only undivided chordal sumps 128.

It is noted that divided chordal sumps 126 and the first and second sump zones (10 and 20) may be created by closing the sumps and their connections at specific places by means of vertical baffles 130. Such vertical baffles 130 may be used also to force the flow in the annular and chordal sumps (110 and 120) in specific directions to create more effective mixing in the liquid mixing collector 1.

Figure 6:
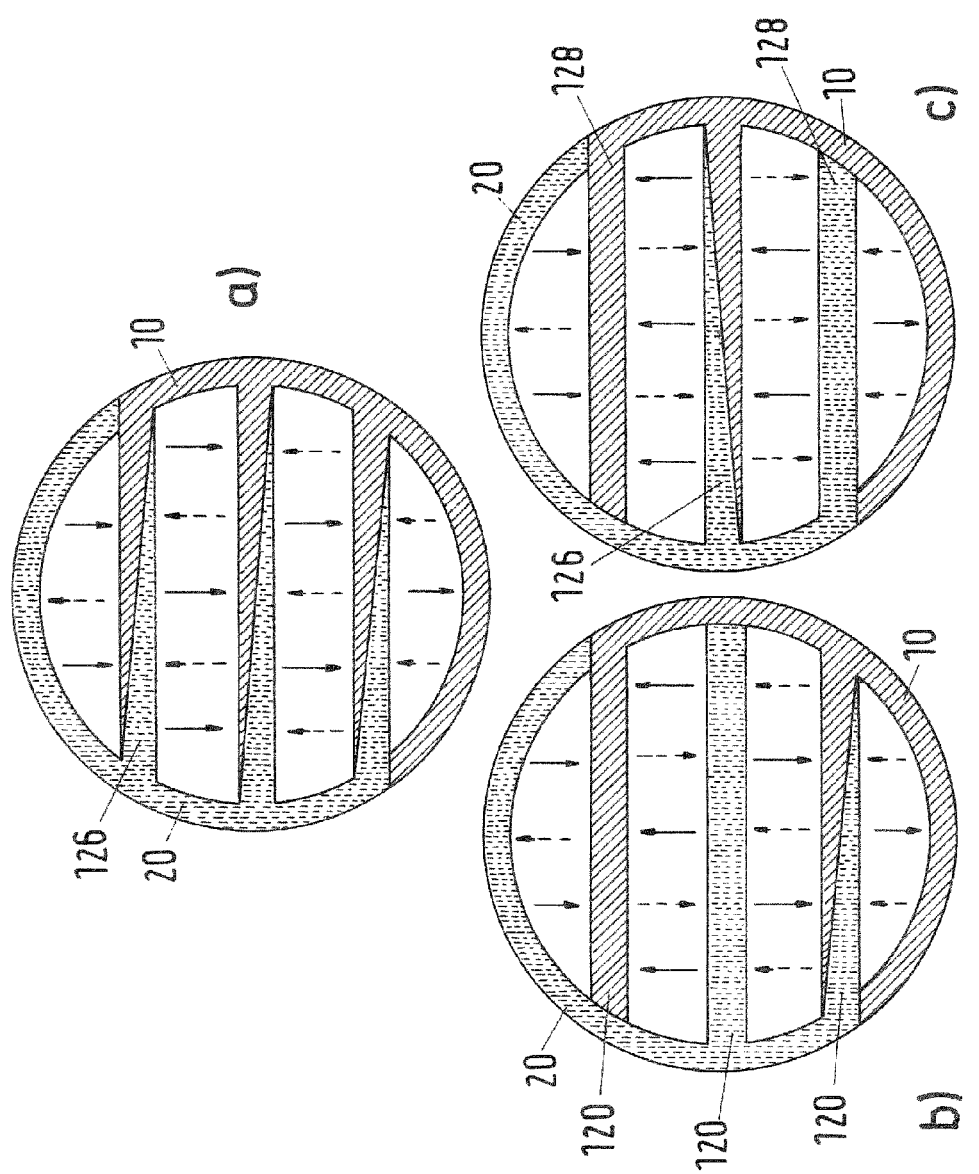
FIG. 6 shows a schematic view of an embodiment of an annular sump and three chordal sumps in combination with a liquid collection configuration of type B in which: a. there are only divided chordal sumps, b. and c. there is one divided chordal sump.

FIG. 6 illustrates three example embodiments of the first and second sump zones (10 and 20) for an embodiment of a liquid mixing collector 1 of the invention having an annular sump 110, three chordal sumps 120, and liquid collection and flow configurations of type B (FIG. 8B). In the example embodiment a. there are only divided chordal sumps 126. In the example embodiment b. the lower chordal sump 120 is a divided chordal sumps 126, and the other two are undivided chordal sumps 128. For liquid mixing collectors 1 having an odd number of chordal sumps 120, it is noted that there will preferably be also an odd number of divided chordal sumps 126, most preferably only one divided chordal sump 126 and the rest only undivided chordal sumps 128. As discussed earlier, all of the liquid collection channels 80 are made discontinuous by the presence of the three chordal sumps 120. Therefore the embodiments shown in FIG. 6 each have a total of four liquid collection regions.

Figure 7:
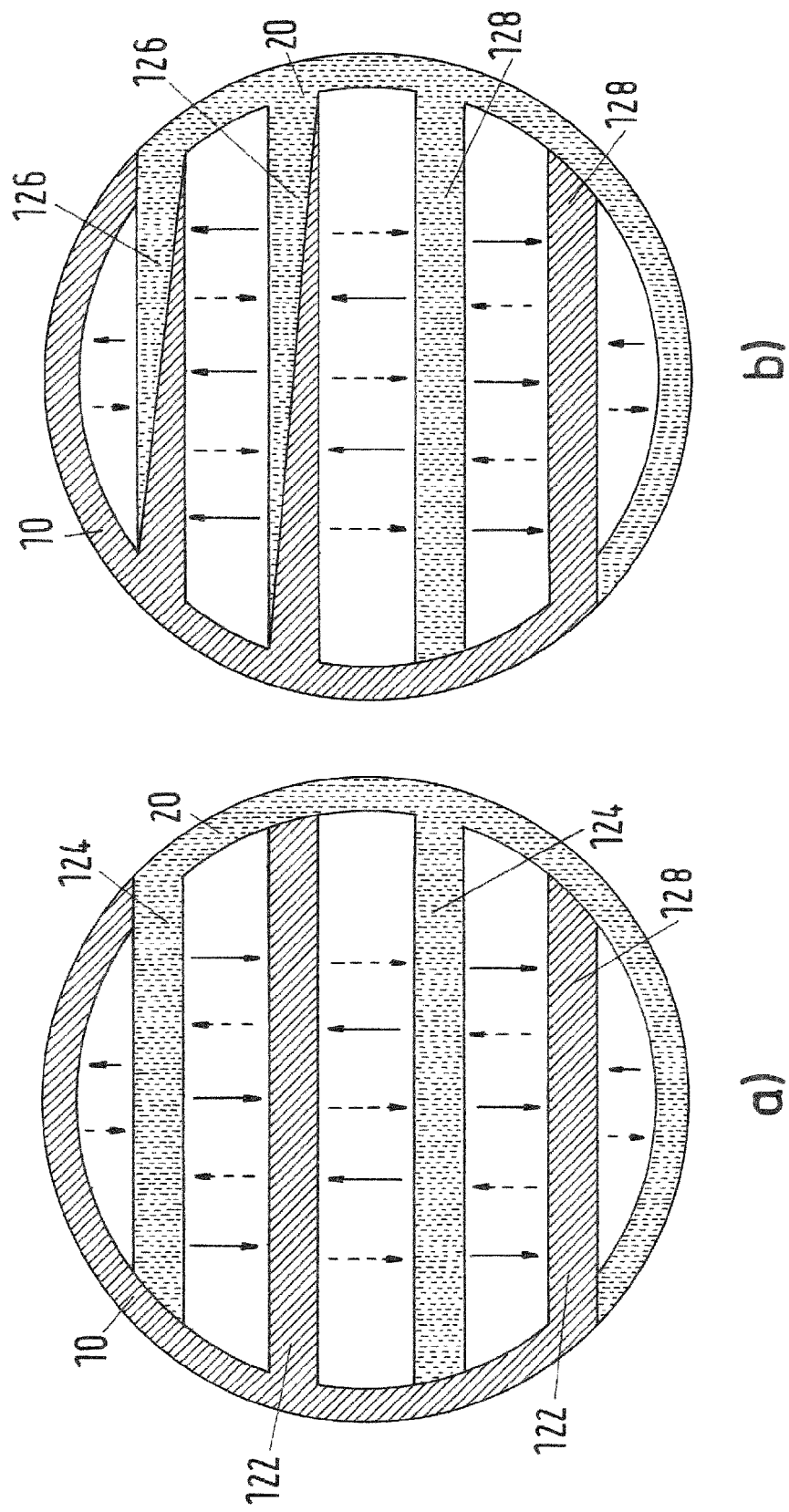
FIG. 7 shows a schematic view of an embodiment of an annular sump and four chordal sumps in combination with a liquid collection configuration of type B in which: a. there are no divided chordal sumps, b. there are two divided chordal sumps.

FIG. 7 illustrates two example embodiments of the first and second sump zones (10 and 20) for an embodiment of a liquid mixing collector 1 of the invention having an annular sump 110, four chordal sumps 120, and liquid collection and flow configurations of type B (FIG. 8B). In the example embodiment a. there are no divided chordal sumps 126 and only undivided chordal sumps 128. In the example embodiment b. the two upper chordal sumps 120 are divided chordal sumps 126, and the other two lower chordal sumps 120 are undivided chordal sumps 128. The embodiment in FIG. 7a illustrates the numbering of chordal sumps 120 into even chordal sumps 122 and odd chordal sumps 124, in which the numbering from 1 to 4 is started from the top chordal sump 120 and continued to the bottom chordal sump 120. All of the liquid collection channels 80 are made discontinuous by the presence of the four chordal sumps 120 in FIG. 7, and therefore these embodiments each have a total of five liquid collection regions.

As may be seen from the Figures, particularly FIGS. 4 to 7, one aspect of the liquid mixing collector of the present invention is that liquid collected in each individual liquid collection region (for embodiments having more than one liquid collection region) is distributed to each of the various sump zones. The effect of this feature is to both improve the mixing in the liquid mixing collector and to avoid detrimental maldistribution effects across the horizontal cross section.

FIG. 8 shows a schematic view of four embodiments of various liquid collection configurations in which first and second sets of liquid collection channels (60, 70) are vertically displaced from each other in various parallel horizontal planes 100. The numbers 1 and 2 refer to which sump zone (first 10 or second 20) to which the channels 80 are associated with. Configurations A and B based on two parallel horizontal planes have been discussed in detail already, whereas configurations C and D are based on three parallel horizontal planes. In configurations C and D, the liquid collection channels 80 are subdivided into subsets 84 of liquid collection channels 80, in which each subset 84 consists of one liquid collection channel 80 in each of the three horizontal planes 100, wherein adjacent subsets 84, 84' are in alternating association with the first and second sump zones (10, 20). In configuration C, the subsets 84 and 84' each consist of three adjacent channels 80; whereas in configuration D the channels 80 of subsets 84 and 84' are interspersed with each other. It is noted that configuration C may be the simplest to design, but configuration D may provide better mixing.

As can be seen in FIG. 8, the ascending vapor flow channels 90 are the openings for vapor flow between neighboring liquid collection channels 80 located in one of the two to four parallel horizontal planes 100. In contrast, the gaps 140 between adjacent liquid collection channels 80 are the openings for vapor flow between adjacent channels 80 vertically displaced from each other in one of at least two to four parallel horizontal planes 100. Thus vapor ascends through the liquid mixing collector by passing through pathways comprising said ascending vapor flow channels 90 and gaps 140 in vapor communication with one another.

In some embodiments, the ascending vapor flow channels 90 are embodied such that the volume between neighboring liquid collection channels 80 located in one of the two to four parallel horizontal planes 100 are substantially open for the flow of vapor. In some specific embodiments, the ascending vapor flow channels 90 are embodied such that at least 50, preferably 80, more preferably 90, most preferably 100% of the area, defined by the edges of neighboring liquid collection channels 80, in a plane containing the opposed longitudinal edges of said neighboring liquid collection channels 80 located in one of the two to four parallel horizontal planes 100, is open for the flow of vapor.

FIG. 9 shows an embodiment of a liquid mixing collector 1 having two chordal sumps 120 but no annular sump 110. It is noted that several of the liquid collection channels 80 have bridging segments 86 that cross over a chordal sump 120 and discontinuous segments 88 that do not cross over a chordal sump 120. As defined earlier, separate liquid collection regions are created due to the presence of chordal sumps 120 that are not bridged by any liquid collection channels 80, as in FIG. 2. Therefore there is only a first liquid collection region in FIG. 9 due to the presence of bridging segments over each of the two chordal sumps 120 present. In some embodiments of the liquid mixing collector 1 of the invention, all liquid collection channels 80 have only discontinuous segments 88, and thus they have two or more liquid collection regions. In other embodiments, some or all of the liquid collection channels 80 have bridging segments 86, and thus a smaller number of liquid collection regions, or even only a single first liquid collection region 40, is present.

FIG. 10 shows a schematic view of a liquid collection region illustrating the feature of a gap 140 between adjacent liquid collection channels 80 and a merlon-shaped liquid collection channel support system 150. In one embodiment, the gaps 140 between adjacent liquid collection channels 80 extend over at least 50, preferably 70, more preferably 80, most preferably 90% of the channel 80 length. In some embodiments, the gap 140 is embodied such that the volume between adjacent channels 80 vertically displaced from each other in the two to four parallel horizontal planes 100 is substantially open for the flow of vapor. In some specific embodiments, the gap 140 is embodied such that at least 50, preferably 80, more preferably 90, most preferably 100% of the area, defined by the edges of said adjacent liquid collection channels 80, in a plane containing the opposed longitudinal edges of said adjacent vertically-displaced channels 80, is open for the flow of vapor. As can be seen from FIG. 10, the gaps 140 allow a simple and cost-effective construction and an assembly of channels using little material. In addition, the gaps 140 provide large open areas for the passage of gas through the collector 1, so pressure drop is minimized in the collector 1 of the invention. In some embodiments, a merlon-shaped liquid collection channel support system 150 is utilized in order to provide a simple and cost-effective means of positioning and fastening the channels 80. Although the gap 140 and the merlon-shaped support system 150 happen to be both shown in FIG. 10, it is not compulsory that they be both present in the same embodiments, however such embodiments may be preferred. For example, a snap-type assembly may be used to avoid welding or plug and turn connections.

Liquid collectors and their construction and operation are well known in the art, for example, as disclosed in Principles Of Mass Transfer And Separation Processes, by B. K. Dutta, published in 2007 by PHI Learning Initiatives (ISBN 978-8120329904), Fundamentals and modeling of separation processes: absorption, distillation, evaporation and extraction, by C. D. Holland, published in 1975 by Prentice-Hall (ISBN 0-13-344390-6). Unless indicated otherwise earlier, conventional construction materials and means, as well as components and auxiliaries, may be used for the liquid mixing collector 1, and the liquid mixing collector 1 may be operated in a mass transfer or heat exchange column or process in a conventional manner as known in the art.

Columns for mass transfer or heat exchange and their construction and operation are well known in the art, for example, as disclosed in Chemical Engineering Design, Vol. 6, Coulson & Richardson's Chemical Engineering Series, by R. K. Sinnott, John Metcalfe Coulson, and John Francis Richardson, 4th Ed. Published in 2005 by Elsevier (ISBN 0 7506 6538 6). Unless indicated otherwise, conventional construction materials and means, as well as components and auxiliaries, may be used for a mass transfer or heat exchange column comprising one or more liquid mixing collectors 1 in a conventional manner as known in the art, for example, in previously cited textbooks, unless indicated otherwise. For example, column auxiliaries may include electrical supplies, coolant and heating fluid supplies and distributions, level controllers, pumps, valves, pipes and lines, reservoirs, drums, tanks, and sensors for measuring such parameters as flow, temperatures, pressures and levels. The column and the method of the invention may be conveniently controlled by means of a computer interface equipped with appropriate sensors.

Although not shown for simplicity, one skilled in the art will understand that other conventional separation device internals may be used without limitation in the column of the invention, such as feed devices like feed pipes and/or sumps, heat exchangers, support plates and grids, dispersers, disperser/support plates, continuous phase distributors, support and hold-down plates, baffles, deflectors, entrainment separators, and retainers/redistributors. Mass transfer internals such as random or structured packings or trays may be beneficially used in the column, method, and use of the invention.

Thus the liquid mixing collector 1 of the invention may be used in a column of the type in which fluid streams are processed to obtain fractionation products and/or otherwise to cause mass transfer and heat exchange between the fluid streams. Such columns comprise a rigid upright shell having a cylindrical, polygonal or other suitable configuration and constructed from metal or other materials compatible with the fluids and conditions within the column. The shell has a diameter and height selected for permitting the desired processing of fluid streams in an open internal area defined by the shell. A liquid mixing collector 1 of the present invention is mounted within the shell of the column in a substantially horizontal orientation and is sized to fill substantially the entire horizontal cross section of the open internal area so that the liquid mixing collector 1 captures substantially all of the liquid descending from an overlying zone. The overlying zone contains any of the various devices commonly found within mass transfer or heat exchange columns that cause lateral distribution of the liquid. For example, the overlying zone can contain a bed of random or structured packing. As was discussed earlier, the present invention can be utilized with different arrangements and numbers of sumps, as well as different numbers and locations of downcomer inlets.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

REFERENCE NUMBERS

1 liquid mixing collector
10 first sump zone
20 second sump zone
30 sump discharge outlet
40 first liquid collection region
50 second liquid collection region
60 first set of liquid collection channels
70 second set of liquid collection channels
80 liquid collection channels
82 drain openings of liquid collection channels
84 subsets of liquid collection channels
86 bridging segment of a liquid collection channel
88 discontinuous segment of a liquid collection channel
90 ascending vapor flow channels
100 horizontal plane 110 annular sump
120 chordal sump
122 even chordal sump
124 odd chordal sump
126 divided chordal sump
128 undivided chordal sump
130 vertical baffle
140 gap between adjacent liquid collection channels
150 merlon-shaped liquid collection channel support system

The invention claimed is:

1. A liquid mixing collector for capturing and mixing liquid descending from an overlying zone in a mass transfer or heat exchange column, the collector comprising:
at least a first and a second sump zone,
at least one discharge outlet positioned in each of said first and second sump zones through which liquid can drain when present in said first and second sump zones;
at least a first and optionally a second liquid collection region, each at least partially bounded by one of said first and second sump zones;
at least a first and a second set of spaced apart liquid collection channels positioned in at least a first liquid collection region; said first set of liquid collection channels embodied such that said liquid collection channels are substantially parallel to and interspersed with said second set of liquid collection channels in the first liquid collection region; drain openings positioned in said liquid collection channels to allow liquid to drain from said liquid collection channels, when present therein, into said first and second sump zones;
said first set of liquid collection channels in the first liquid collection region being associated with said first sump zone so that liquid when present in said first set of liquid collection channels flows into said first sump zone;
said second set of liquid collection channels in the first liquid collection region being associated with said second sump zone so that liquid when present in said second set of liquid collection channels flows into said second sump zone;
ascending vapor flow channels located in a spacing between the liquid collection channels in the liquid collection regions;
wherein adjacent liquid collection channels of the first and second sets of liquid collection channels are vertically displaced from each other in one of at least two to four parallel horizontal planes.

2. The liquid mixing collector of claim 1, wherein the liquid, when present in said first set of liquid collection channels, flows through the drain openings of the first set of liquid collection channels into said first sump zone.

3. The liquid mixing collector of claim 1, wherein the liquid, when present in said second set of liquid collection channels, flows through the drain openings of the second set of liquid collection channels into said second sump zone.

4. The liquid mixing collector of claim 1, wherein the collector comprises an annular sump and one or more chordal sumps.

5. The liquid mixing collector of claim 4, wherein the collector comprises an odd number of chordal sumps,
wherein the first sump zone comprises at least one portion of the annular sump and at least one portion of one chordal sump, wherein the second sump zone comprises at least one portion of the annular sump and at least one portion of one chordal sump.

6. The liquid mixing collector of claim 5, wherein the collector is suitable for collecting liquid to be discharged by means of one to four discharge outlets per sump zone, and wherein the collector comprises from two to ten chordal sumps.

7. The liquid mixing collector of claim 5, wherein the collector is suitable for collecting liquid to be distributed to a section of a column located below the collector, and wherein the collector comprises from one to twenty chordal sumps per meter measured over the diameter of the collector in an orientation perpendicular to the chordal sumps.

8. The liquid mixing collector of claim 4, wherein the collector comprises an even number of chordal sumps,
wherein the first sump zone comprises at least one portion of the annular sump and one portion of one or more chordal sumps,
and wherein the second sump zone comprises at least one portion of the annular sump and one portion of one or more chordal sumps.

9. The liquid mixing collector of claim 8, wherein the collector is suitable for collecting liquid to be discharged by means of one to four discharge outlets per sump zone, and wherein the collector comprises from two to ten chordal sumps.

10. The liquid mixing collector of claim 8, wherein the collector is suitable for collecting liquid to be distributed to a section of a column located below the collector, and wherein the collector comprises from one to twenty chordal sumps per meter measured over the diameter of the collector in an orientation perpendicular to the chordal sumps.

11. The liquid mixing collector of claim 1, wherein the collector lacks an annular sump, and the collector comprises at least one divided chordal sump or two chordal sumps, wherein the first liquid collection region, and the second liquid collection region, when present.

12. The liquid mixing collector of claim 1,
wherein the first sump zone and the second sump zone are separated from each other by means of vertical baffles.

13. The liquid mixing collector of claim 1,
wherein the height of the collector is less than 2 meters.

14. The liquid mixing collector of claim 1,
wherein the liquid collection channels in each of the two to four parallel horizontal planes are embodied so as to collect a substantially same amount of liquid in each of the horizontal planes.

15. The liquid mixing collector of claim 1, wherein the liquid collection channels are subdivided into subsets of liquid collection channels, wherein each subset consists of one liquid collection channel in each of the horizontal planes, wherein adjacent subsets are in alternating association with the first and second sump zones.

16. The liquid mixing collector of claim 1,
wherein the second liquid collection region is present and the first and second liquid collection regions are embodied so as to collect a substantially same amount of liquid in each region.

17. The liquid mixing collector of claim 1, wherein a plurality of upwardly extending deflectors having surfaces for directing liquid when descending from an overlying zone into said liquid collection channels are absent from said collector.

18. The liquid mixing collector of claim 1,
wherein at least a portion of the liquid when present in said first set of liquid collection channels flows through the drain openings of the first set of liquid collection channels into said first sump zone.

19. The liquid mixing collector of claim 18,
wherein at least a portion of the liquid when present in said second set of liquid collection channels flows through the drain openings of the second set of liquid collection channels into said second sump zone.

20. A mass transfer or heat exchange column comprising one or more liquid mixing collectors according to claim 1.

21. Use of the liquid mixing collector of claim 1 in a mass transfer or heat exchange column for liquid flow rates higher than 10 m$^3$/m$^2$h.

22. A method for collecting and mixing descending liquid in a mass transfer or heat exchange column, said method comprising the steps of:
collecting descending liquid in at least a first and a second set of liquid collection channels positioned within each of at least a first liquid collection region and an optional second liquid collection region, said first set of liquid collection channels embodied such that said liquid collection channels are substantially parallel to and interspersed with said second set of liquid collection channels in at least said first liquid collection region, and said second liquid collection region if present, wherein adjacent liquid collection channels of the first and second set of liquid collection channels are vertically displaced from each other in one of at least two to four parallel horizontal planes;
directing a first quantity of liquid from said first set of liquid collection channels in both of said first liquid collection region and said second liquid collection regions if present, into a first sump zone and directing a second quantity of liquid from said second set of said liquid collection channels in at least said first liquid collection region and said second liquid collection region into a second sump zone;
draining said liquid from said first and second sump zones,
wherein the above recited steps are performed using the liquid mixing collector of claim 1.

* * * * *